US 9,454,378 B2

(12) United States Patent
Cote et al.

(10) Patent No.: US 9,454,378 B2
(45) Date of Patent: Sep. 27, 2016

(54) GLOBAL CONFIGURATION BROADCAST

(71) Applicant: Apple Inc., Cupertino, CA (US)

(72) Inventors: Guy Cote, San Jose, CA (US); Joseph P. Bratt, San Jose, CA (US); Nitin Bhargava, San Jose, CA (US); Hao Chen, San Ramon, CA (US); Joseph J. Cheng, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 14/083,010

(22) Filed: Nov. 18, 2013

(65) Prior Publication Data

US 2015/0095630 A1    Apr. 2, 2015

Related U.S. Application Data

(60) Provisional application No. 61/884,702, filed on Sep. 30, 2013.

(51) Int. Cl.
*G06F 3/00* (2006.01)
*G06F 13/00* (2006.01)
*G06F 9/44* (2006.01)
*G06F 3/06* (2006.01)
*G06F 9/445* (2006.01)

(52) U.S. Cl.
CPC ........... *G06F 9/4401* (2013.01); *G06F 3/0629* (2013.01); *G06F 8/71* (2013.01); *G06F 9/445* (2013.01)

(58) Field of Classification Search
CPC ........ G06F 3/0029; G06F 8/71; G06F 9/445; G06F 11/1423; G06F 3/0629
USPC .......................................... 710/3, 8, 10, 104
See application file for complete search history.

(56) References Cited

U.S. PATENT DOCUMENTS

| | | | |
|---|---|---|---|
| 5,734,921 A | 3/1998 | Dapp et al. | |
| 5,784,636 A | 7/1998 | Rupp | |
| 5,862,357 A | 1/1999 | Hagersten et al. | |
| 6,275,869 B1 * | 8/2001 | Sieffert | G06F 19/321 709/229 |
| 7,469,308 B2 | 12/2008 | Hobson et al. | |
| 2005/0038928 A1 * | 2/2005 | Meyer | G06F 17/5045 710/8 |
| 2006/0282585 A1 * | 12/2006 | You | G06F 13/423 710/104 |
| 2007/0118717 A1 * | 5/2007 | Sanada | G06F 12/0646 711/173 |
| 2007/0296457 A1 * | 12/2007 | Kikuchi | H03K 19/17736 326/38 |
| 2009/0083471 A1 * | 3/2009 | Frey | G06F 13/4054 710/316 |

* cited by examiner

*Primary Examiner* — Idriss N Alrobaye
*Assistant Examiner* — Getente A Yimer
(74) *Attorney, Agent, or Firm* — Robert C. Kowert; Meyertons, Hood, Kivlin, Kowert & Goetzel, P.C.

(57) ABSTRACT

Methods and apparatus for configuring multiple components of a subsystem are described. The configuration memory of each of a plurality of components coupled to an interconnect includes a global configuration portion. The configuration memory of one of the components may be designated as a master global configuration for all of the components. A module coupled to the interconnect may receive writes to the components from a configuration source. For each write, the module may decode the write to determine addressing information and check to see if the write is addressed to the master global configuration. If the write is addressed to the master global configuration, the module broadcasts the write to the global configuration portion of each of the components via the interconnect. If the write is not addressed to the master global configuration, the module forwards the write to the appropriate component via the interconnect.

17 Claims, 10 Drawing Sheets

GLOBAL CONFIGURATION BROADCAST

PRIORITY INFORMATION

This application claims benefit of priority of U.S. Provisional Application Ser. No. 61/884,702 entitled "GLOBAL CONFIGURATION BROADCAST" filed Sep. 30, 2013, the content of which is incorporated by reference herein in its entirety.

BACKGROUND

1. Technical Field

This disclosure relates generally to sharing a configuration space across multiple components of a subsystem.

2. Description of the Related Art

Various devices including but not limited to personal computer systems, desktop computer systems, laptop and notebook computers, tablet or pad devices, digital cameras, digital video recorders, and mobile phones or smart phones may include subsystems that implement various functionalities. As just one example, a device may include an apparatus (e.g., an integrated circuit (IC), such as a system-on-a-chip (SOC), or a subsystem of an IC), that may receive and process digital video input from one or more sources and output the processed video frames according to one or more video processing methods. Such a subsystem may include multiple functional components or units that each performs a sub-operation or sub-operations of the subsystem. For example, a video encoder or other apparatus or subsystem may include a pipeline for processing digital frames or portions of frames, the pipeline composed of multiple functional units or components that each performs one or more operations on a frame or portion of a frame passing through the pipeline. In many such subsystems that include multiple functional components, a configuration space may be shared across the components. In other words, there may be one or more global configuration parameters that are common to many or all of the components of a subsystem. The shared configuration space of the components of a subsystem may need to be periodically or aperiodically set or reset by an external entity such as a control program execution on processor(s) of the subsystem. For example, in a pipeline of a video processor such as a video encoder, the configuration of the components may need to be set or reset on frame boundaries.

SUMMARY OF EMBODIMENTS

Embodiments of methods and apparatus for configuring multiple components of a system, subsystem, device, or apparatus are described. In embodiments, rather than including a separate global configuration memory that is hardwired to each of multiple functional components of a device or apparatus, the configuration memory of each functional component includes a global configuration portion. However, rather than relying on software to write to the global configuration of each component, the configuration memory of one of the components may be designated as a master global configuration for all of the components. A configuration module coupled to the interconnect may receive writes to the functional components, for example writes from a configuration source such as a processor or processors. For each write, the configuration module may decode the write to determine addressing information. The configuration module may check to see if the write is addressed to the master global configuration. If the write is addressed to the master global configuration, then the configuration module broadcasts the write to the global configuration portion of each of the functional components via the interconnect. In at least some embodiments, to broadcast the write, the write is sent by the configuration module to the address space of each functional component via the interconnect; the configuration module translates the address across the components.

In at least some embodiments, if the write is not addressed to the master global configuration, the configuration module forwards the write to the appropriate functional component via the interconnect. Thus, it is possible to use the broadcast function of the configuration module to globally configure all of the functional components, and then selectively reconfigure one or more of the functional components by writing directly to the components if necessary or desired.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Various embodiments of methods and apparatus for configuring multiple functional components of a device or apparatus are described. A hardware apparatus or device such as a system on a chip (SOC) or integrated circuit (IC) may include multiple functional units, blocks, or partitions, which may be referred to as functional components or just components. The components may be coupled to an interconnect such as a bus subsystem or fabric. An address space of the interconnect may be allocated to the components, with each component assigned a unique portion of the address space. Each component may be configurable, and each component may include a configuration memory such as a set of registers. However, at least some configuration information for the components may be global or common to all of the components.

A conventional solution for providing global configuration information to multiple components is to have a separate global configuration memory (e.g., a common set of registers) that is hardwired to each of the functional components. Since there may be many functional components and a global configuration may include multiple parameters, this wiring can be quite complex and may require many wired interconnections between the global configuration memory and the functional components.

Figures 1A, 1B:
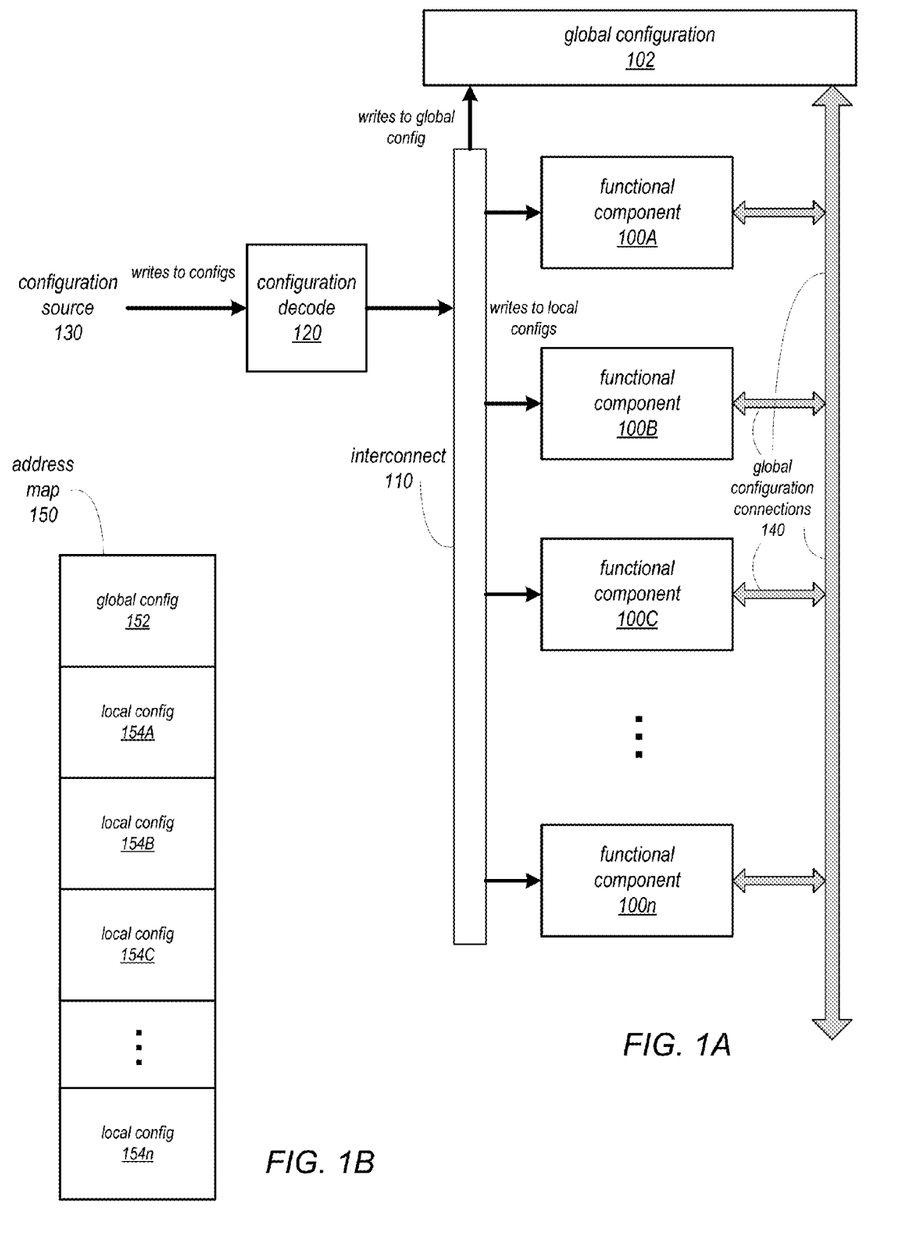
FIGS. 1A and 1B illustrate configuring multiple components via a separate global configuration memory.

FIGS. 1A and 1B illustrate configuring multiple components via a separate global configuration memory. In FIG. 1A, functional components 100A-100n are each coupled to an interconnect 110. In addition, a global configuration 102 memory component is coupled to the interconnect 110. FIG. 1B graphically represents a map 150 of address space of the interconnect 110. In FIG. 1B, global configuration 152 represents a portion of the address space allocated to global configuration 102. Local configurations 154A-154n represent portions of the address space allocated to functional components 100A-100n, respectively. Writes from a configuration source 130 are handled by a configuration decode 120 component or module. Upon receiving a write from a configuration source 130, configuration decode 120 determines the target of the write (either global configuration 102 if the write is to set a global configuration parameter or parameters or one of the functional components 100A-100n if the write is to set a local configuration parameter or parameters) and sends the write to the address space of the target via the interconnect 110. Thus, global configuration information is written to global configuration 102, and local configuration information is written to target ones of functional components 100A-100n. Global configuration connections 140 represent physical wiring that connects global configuration 102 to each of the functional components 100A-100n.

As an alternative to a separate global configuration memory that is hardwired to each of the functional components, the configuration memory of each functional component may include a global configuration portion. Conventionally, control or configuration software executing on one or more processors would handle addressing writing global configuration information to each of the functional components when necessary, for example via write requests to the components via an interconnect to which the components are coupled. However, it may be difficult to guarantee consistency of the global configuration across many functional components when relying on software to set and maintain the global configuration of the components. Furthermore, this would require a significant amount of overhead, as multiple writes of the same parameter values to the different components would be required to configure all of the components.

Figures 2A, 2B:
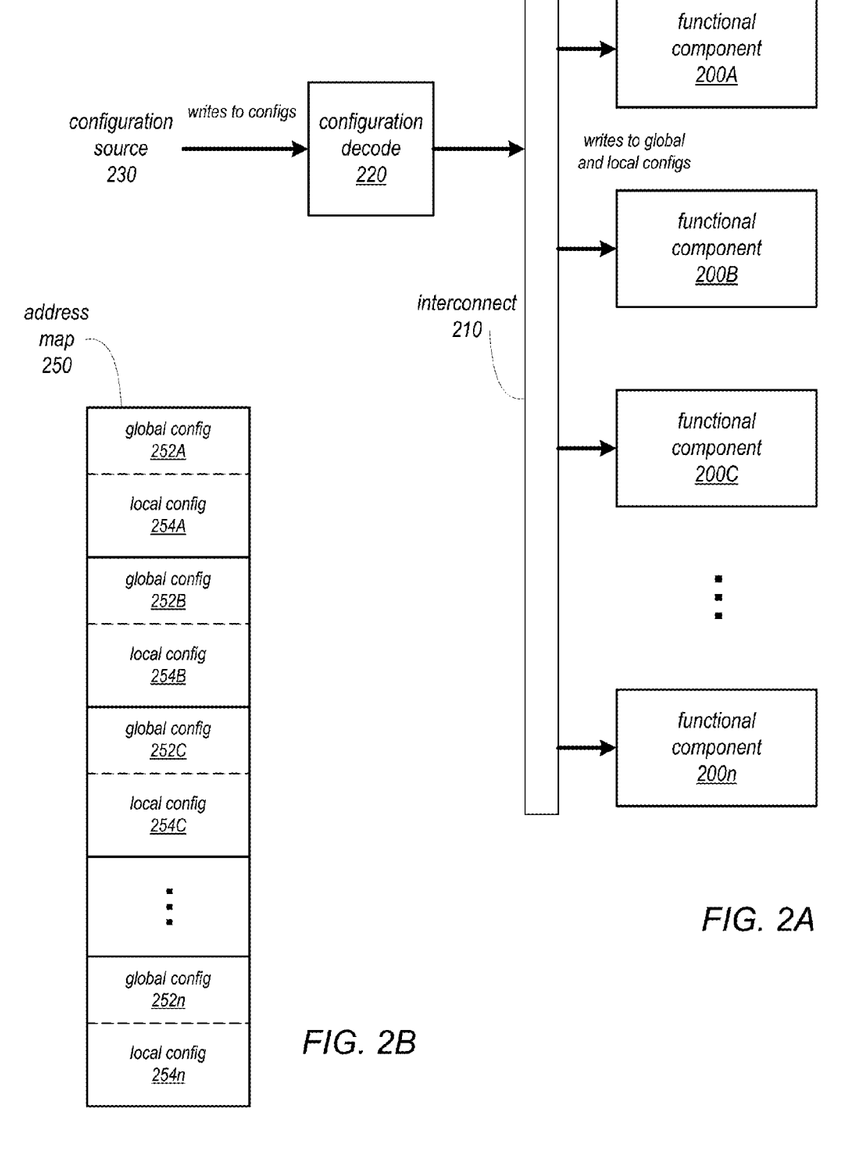
FIGS. 2A and 2B illustrate configuring multiple components via software.

FIGS. 2A and 2B illustrate configuring multiple components via software. In FIG. 2A, functional components 200A-200n are each coupled to an interconnect 210. FIG. 2B graphically represents a map 250 of address space of the interconnect 210. In FIG. 2B, global configurations 252A-252n represent portions of the address space allocated to global configuration portions of the configuration memories of functional components 200A-200n, respectively. Local configurations 254A-254n represent portions of the address space allocated to local configuration portions of the configuration memories of functional components 200A-200n, respectively. Writes from a configuration source 230 (e.g., software running on one or more processors) are handled by a configuration decode 220 component or module. Upon receiving a write from a configuration source 230, configuration decode 220 determines the target of the write (one of global configurations 252A-252n of the functional components 200A-200n if the write is to set a global configuration parameter or parameters, or one of local configurations 254A-254n of the functional components 200A-200n if the write is to set a local configuration parameter or parameters) and sends the write to the address space of the target via the interconnect 210. Thus, global configuration information is written to each of global configurations 252A-252n, and local configuration information is written to target ones of local configurations 254A-254n. To set a global parameter or parameters for all of the functional components 200A-200n, a configuration source 230 (e.g., software running on one or more processors) would have to issue writes to each of global configurations 252A-252n.

In embodiments of methods and apparatus for configuring multiple functional components of an apparatus or device, rather than including a separate global configuration memory that is hardwired to each of the functional components, the configuration memory of each functional component includes a global configuration portion. However, rather than relying on software to write to the global configuration of each component, the configuration memory of one of the components may be designated as a master global configuration for all of the components. A configuration module coupled to the interconnect may receive writes to the functional components, for example writes from a configuration source such as a processor or processors. For each write, the configuration module may decode the write to determine addressing information. The configuration module may check to see if the write is addressed to the master global configuration. If the write is addressed to the master global configuration, then the configuration module broadcasts the write to the global configuration portion of each of the functional components via the interconnect. In at least some embodiments, to broadcast the write, the write is sent by the configuration module to the address space of each functional component via the interconnect; the configuration module translates the address across the components.

In at least some embodiments, if the write is not addressed to the master global configuration, the configuration module forwards the write to the appropriate functional component via the interconnect. Thus, it is possible to use the broadcast function of the configuration module to globally configure all of the functional components, and then selectively reconfigure one or more of the functional components by writing directly to the components if necessary or desired.

Thus, using a hardware module (the configuration module) and a protocol of the interconnect, an apparatus can maintain a consistent global configuration across multiple functional components of the apparatus without requiring hardwiring to each individual component from a global configuration memory and without requiring multiple writes of the same information to each of the different components by broadcasting a single write addressed to a master global configuration on one of the components to the global configurations of all of the components. In addition, the configuration of particular ones of the components can be customized after globally configuring the components if necessary or desired by writing directly to the particular component rather than to the master global configuration.

As an example of an apparatus in which embodiments may be implemented, a video encoder apparatus may include a block processing pipeline that includes multiple stages, each stage including one or more functional units or components. Each of the functional components of the block processing pipeline may include a configuration memory, for example a set of registers. The functional components of the block processing pipeline may share one or more common or global configuration parameters. A portion of each configuration memory may be allocated to the global configuration parameters for the pipeline. The functional components of the pipeline may be coupled to an interconnect such as a bus subsystem. An address space of the interconnect may be allocated to the configuration memories of the components, with each configuration memory assigned a portion of the address space. The configuration memory of one of the functional components may be designated as a master global configuration for the functional components of the pipeline. The apparatus may include a configuration module that is coupled to the interconnect. A configuration source (e.g., a processor or processors of the video encoder apparatus or a processor external to the video encoder apparatus) may periodically or aperiodically configure the block processing pipeline. For example, the video encoder apparatus may reconfigure the block processing pipeline at video frame boundaries. In other words, one or more global configuration parameters of the pipeline may be changed to process each different frame of a video sequence. To set one or more global configuration parameters for all of the pipeline components, a single write may be issued to the master global configuration. (Note that, in some implementations, multiple writes to the master global configuration may be used to set the global configuration parameters of the components). A configuration module coupled to the interconnect receives the write, determines that the write is addressed to the master global configuration, translates the address to all of the global configurations for all of the components, and broadcasts the write to all of the components of the pipeline via the interconnect.

Figures 3A, 3B:
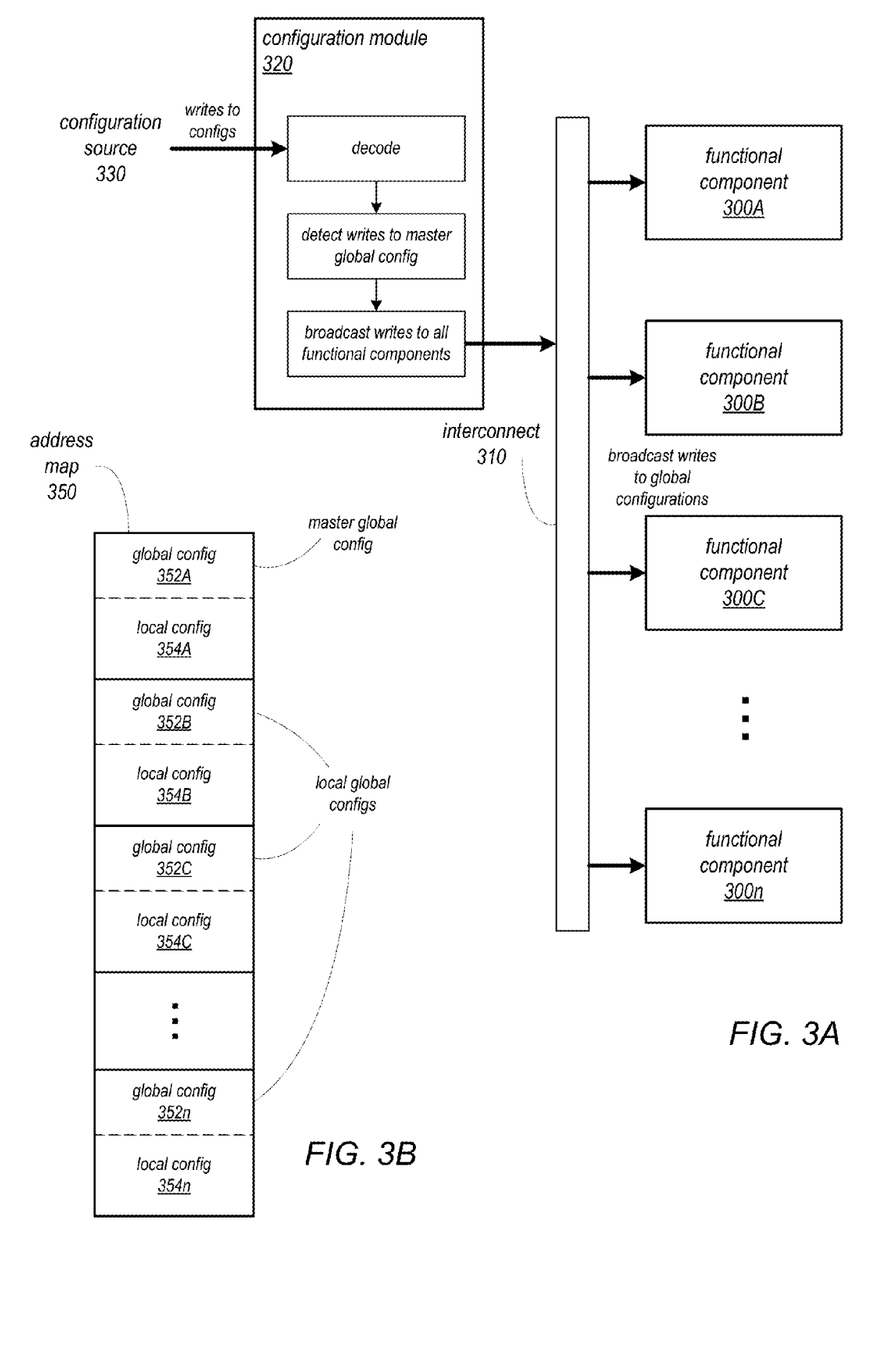
FIGS. 3A and 3B illustrate methods and apparatus for configuring multiple functional components of an apparatus or device in which a write to a master global configuration is broadcast to multiple functional components, according to at least some embodiments.
Figure 3C:
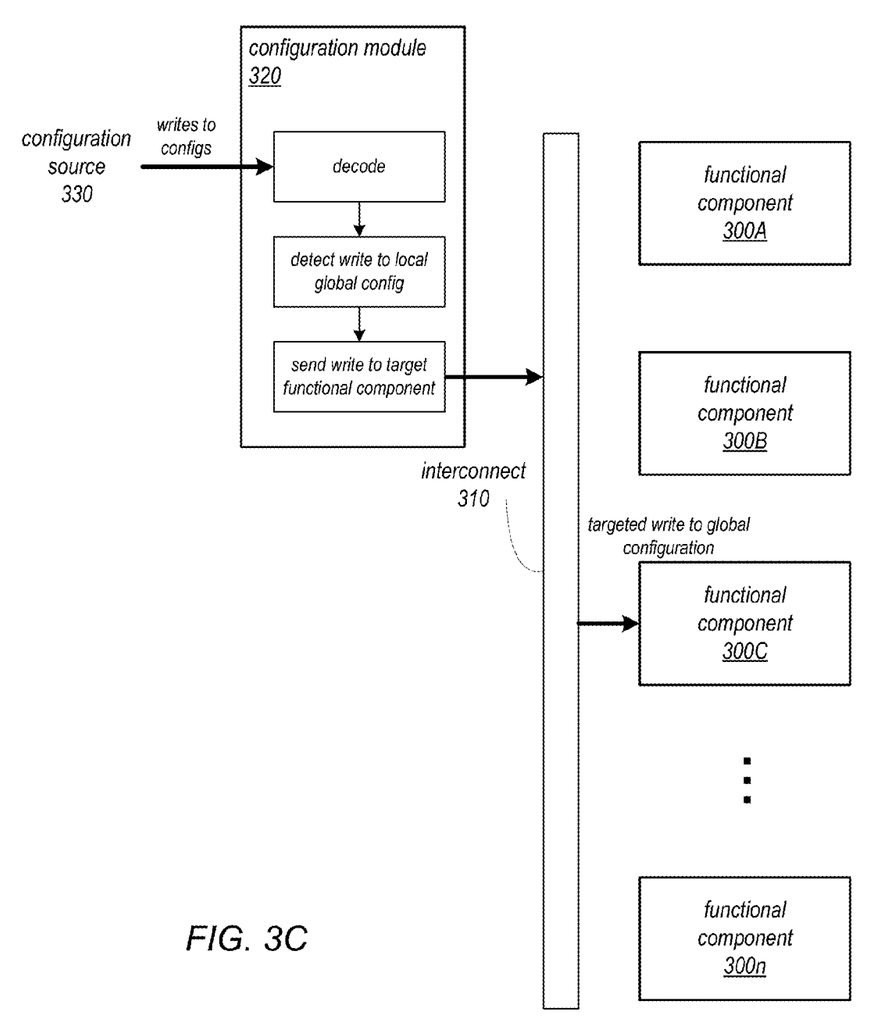
FIG. 3C illustrates overwriting a global configuration parameter or parameters for one or more functional components, according to at least some embodiments.

FIGS. 3A through 3C illustrate methods and apparatus for configuring multiple functional components of an apparatus or device in which a write to a master global configuration is broadcast to multiple functional components, according to at least some embodiments. In FIG. 3A, functional components 300A-300n are each coupled to an interconnect 310. FIG. 3B graphically represents a map 350 of address space of the interconnect 310. In FIG. 3B, global configurations 352A-352n represent portions of the address space allocated to global configuration portions of the configuration memories of functional components 300A-300n, respectively. Local configurations 354A-354n represent portions of the address space allocated to local configuration portions of the configuration memories of functional components 300A-300n, respectively. One of the global configurations 352 (in this example, global configuration 352A of functional component 300A) is designated as a master global configuration. The other global configurations 352 (in this example, global configurations 352B-352n of functional components 300B-300n) may be referred to as local global configurations.

Referring to FIG. 3B, writes from a configuration source 330 (e.g., software running on one or more processors) are handled by a configuration module 320. Upon receiving a write from a configuration source 330, configuration module 320 decodes address information of the write. Based on the decoded address information, configuration module 320 may determine that the write is directed to the master global configuration for the components 300, in this example the global configuration 352A of functional component 300A. In response to determining that the write is directed to the master global configuration, the configuration module 320 broadcasts the write to the global configurations 352 of all of the components 300 (in this example, to global configurations 352A-352n of functional components 300A-300n). Thus, a single write of global configuration information to a designated component 300A results in the global configuration information being written to all of the functional components 300A-300n. Moreover, this is accomplished via a protocol over an interconnect 310 such as a bus subsystem, does not require custom hardwiring from a global configuration memory to each of the functional components, and does not require separate writes by the configuration source 330 to set the global configuration for each of the multiple components 300.

FIG. 3C illustrates overwriting a global configuration parameter or parameters for one or more functional components, according to at least some embodiments. In some implementations, it may be the case that one or more global configuration parameters of one or more components need to be changed. In at least some embodiments, after setting the global configuration using a write to a master global configuration that is broadcast to the global configuration of all of the components being configured, one or more writes may be issued to one or more specific ones of the components to change the settings of one or more global configuration parameters for the target component(s).

Upon receiving a write from a configuration source 330, configuration module 320 decodes the address information of the write and determines that the write is not directed to the master global configuration for the components 300 (in this example, global configuration 252A of component 300A), but is instead directed to the local global configuration of one of the other components (in this example, global configuration 352C of component 300C). The configuration module 320 thus does not broadcast the write to all of the components. Instead, the module 320 sends the write only to the target functional component 300, in this example component 300C. Thus, one or more specific global configuration parameters, or even the entire global configuration, of a given component 300 may be changed by the configuration source 330 by issuing targeted writes as necessary or desired.

While not shown, in at least some embodiments, a configuration source 330 may also write configuration parameters to the local configurations 354 of the functional components 300. Upon determining that a write is directed to a local configuration 354 of a component 300, configuration module 320 sends the write to the target component 300 via the interconnect 310.

Figure 4:
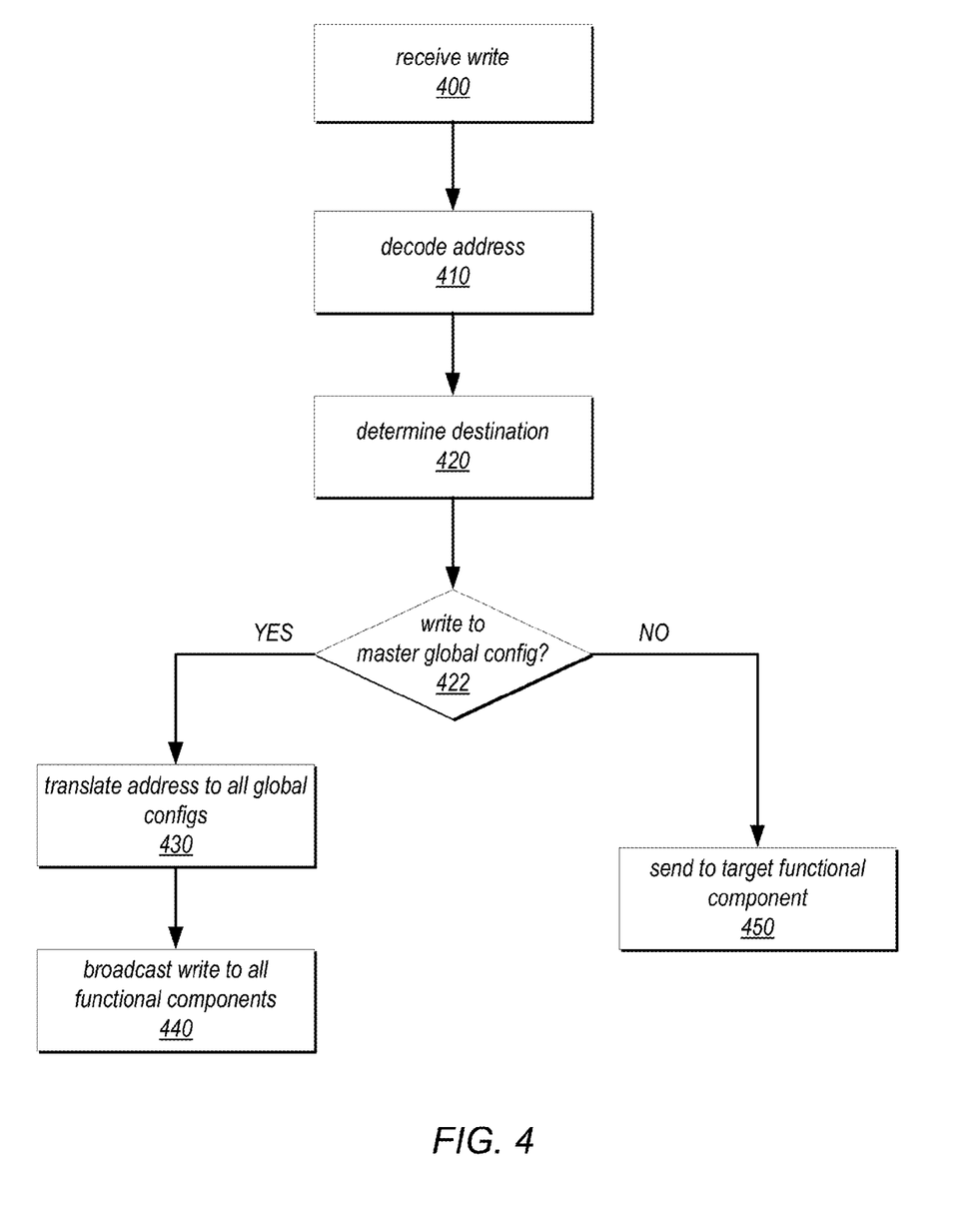
FIG. 4 is a flowchart of a method for configuring multiple functional components of an apparatus or device, according to at least some embodiments.

FIG. 4 is a flowchart of a method for configuring multiple functional components of an apparatus or device, according to at least some embodiments. The method of FIG. 4 may be implemented in hardware, software, or a combination thereof, for example by a configuration module coupled to an interconnect (e.g., a bus subsystem) that is also coupled to multiple functional components of an apparatus, for example a configuration module 330 as illustrated in FIGS. 3A through 3C. Each of the multiple components may be assigned an address space on the interconnect for a configuration memory of the component. The configuration memory of each component may include a global configuration portion and a local configuration portion. The global configuration portion of one of the components may be designated as a master global configuration for all of the components.

As indicated at 400 of FIG. 4, a write may be received. The write may be from a configuration source, for example software running on one or more processors. As indicated at 410, address information of the write may be decoded. At 420, based on the decoded address information, a target on the interconnect may be determined. At 422, if the write is directed to the address space allocated to the master global configuration, then the address information is translated to all of the global configurations for all of the functional components, as indicated at 430. The write is then broadcast on the interconnect to all of the functional components, as indicated at 440. Thus, a single write of global configuration information to a designated component results in the global configuration information being written to all of the functional components. This is accomplished via a protocol over an interconnect such as a bus subsystem, does not require custom hardwiring from a global configuration memory to each of the functional components, and does not require separate writes by a configuration source to set the global configuration for each of the multiple components.

At 422 of FIG. 4, if the write is not directed to the master global configuration, then at 450 the write is sent only to the target functional component. Note that this allows one or more specific global configuration parameters, or even the entire global configuration, of a given component to be changed by a configuration source after setting the global configuration of all of the components by subsequently issuing targeted writes to particular components as necessary or desired.

In FIGS. 3A through 3C, the global address space of one of the functional components 300 coupled to an interconnect in an apparatus or device is designated as the master global configuration for all of the functional components 300. In some embodiments, as an alternative to designating a functional component on an interconnect that performs other operations, for example a pipeline unit of a block processing pipeline that performs particular operations at a stage of the pipeline, as the master global configuration for a set of functional components coupled to the interconnect, a component may be coupled to the interconnect and used solely as a dedicated master global configuration component. In other words, this component may not perform any other function or operation than that of a master global configuration for multiple functional components coupled to an interconnect such as a bus subsystem.

Figures 5A, 5B:
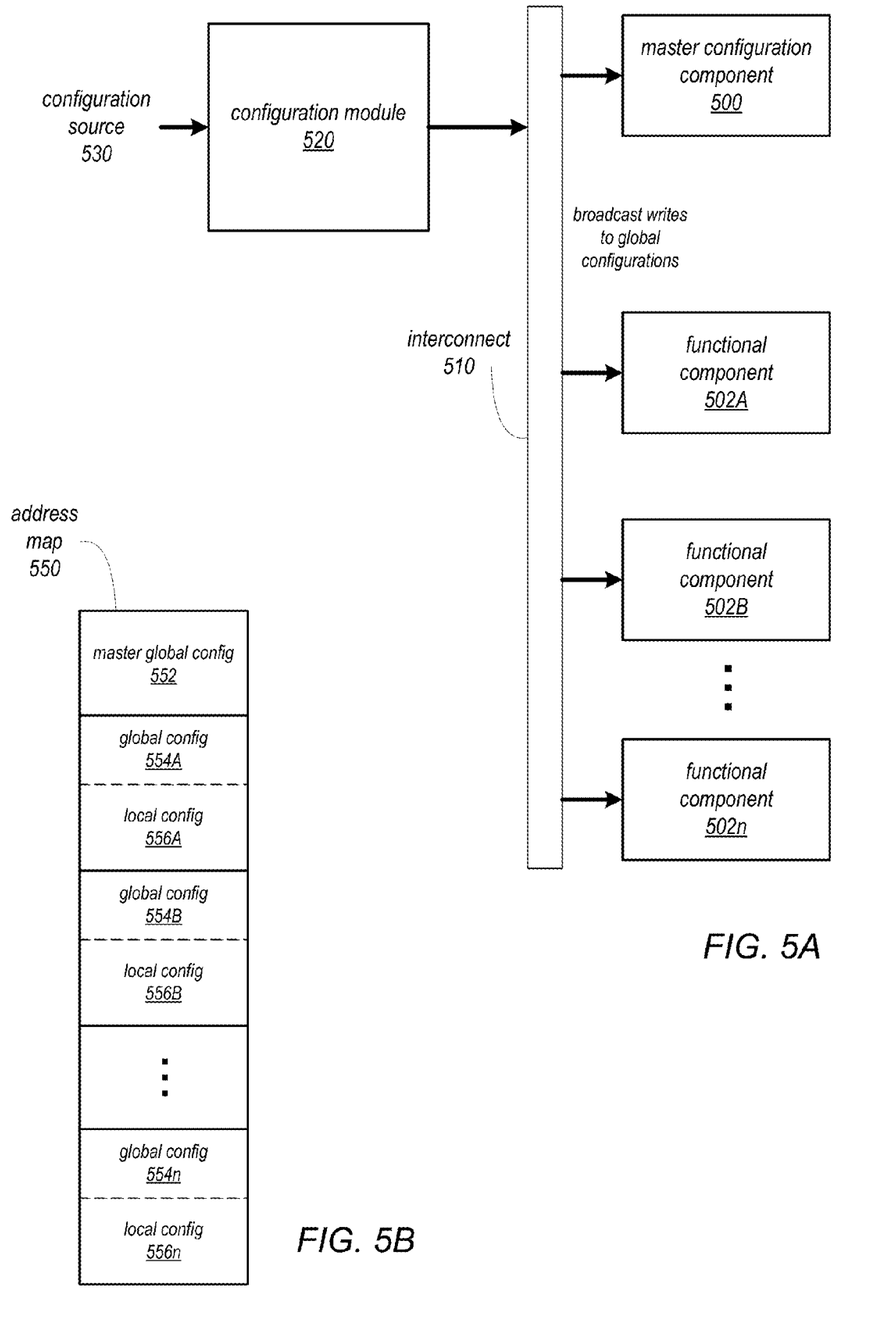
FIGS. 5A and 5B illustrate methods and apparatus for configuring multiple functional components of an apparatus or device in which a component is a dedicated master global configuration for multiple functional components, according to at least some embodiments.

FIGS. 5A and 5B illustrate methods and apparatus for configuring multiple functional components of an apparatus or device in which a component is a dedicated master global configuration for multiple functional components, according to at least some embodiments. In FIG. 5A, functional components 502A-502n are each coupled to an interconnect 510. In addition, a master configuration component 500 is also coupled to the interconnect 510. FIG. 5B graphically represents a map 550 of address space of the interconnect 510. In FIG. 5B, master global configuration 552 is the address space of master configuration component 500. Global configurations 554A-554n represent portions of the address space allocated to global configuration portions of the configuration memories of functional components 502A-502n, respectively. Local configurations 556A-556n represent portions of the address space allocated to local configuration portions of the configuration memories of functional components 502A-502n, respectively.

Referring to FIG. 5B, writes from a configuration source 530 (e.g., software running on one or more processors) are handled by a configuration module 520. Upon receiving a write from a configuration source 530, configuration module 520 decodes address information of the write. Based on the decoded address information, configuration module 520 may determine that the write is directed to address space of the master configuration component 500. In response to determining that the write is directed to the master configuration component 500, the configuration module 520 translates the address and broadcasts the write to the global configurations 554 of all of the functional components 502. Thus, a single write of global configuration information to a master configuration component 500 results in the global configuration information being written to all of the functional components 502A-502n. This is accomplished via a protocol over an interconnect 510 such as a bus subsystem, does not require custom hardwiring from a global configuration memory to each of the functional components, and does not require separate writes by the configuration source 530 to set the global configuration for each of the multiple functional components 502. In at least some embodiments, after setting the global configuration using a write to the master configuration component 500 that is broadcast to the global configurations of all of the functional components 502, one or more writes may be issued to one or more specific ones of the functional components 502 to change the settings of one or more global configuration parameters for the target component(s) 502.

Distributed Decode Global Broadcast

FIGS. 3A through 5B and the above discussion describe what may be referred to as a centralized decode global broadcast method in which a configuration memory of one of multiple components coupled to an interconnect may be designated as a master global configuration for all of the components. A configuration module centrally decodes writes directed to the components. For writes addressed to the master global configuration, the writes are broadcast to all of the components. For writes addressed to the local global configuration of a particular one of the components, the write is sent only to the particular component.

As an alternative to the centralized decode global broadcast method, a distributed decode global broadcast method may be used in some implementations. In the distributed method, a configuration memory of one of multiple components coupled to an interconnect may be designated as a master global configuration for all of the components. However, the configuration module may always broadcast the write address and write data to all of the components on the interconnect. Each component may locally decode each write to determine whether or not to accept the write. Thus, each component locally accepts two address regions (the address region of the master global configuration and the address region of the component's local global configuration) for writes. For reads, only the master global configuration would respond.

Using the distributed decode method, for writes to the master global configuration, the configuration module would broadcast the write to all of the components on the interconnect. Each component locally decodes the write and determines that the write is addressed to the master global configuration, and accepts the write. For writes to a particular component's local global region, the configuration module would broadcast the write to all of the components on the interconnect. Each component locally decodes the write. However, only the target component accepts the write because the write decodes into the component's local global configuration. The other components reject the write because the decoded address does not match either the address region of the master global configuration or the address region of the component's local global configuration.

Example Applications

Embodiments of the methods and apparatus for configuring multiple functional components in which a write to a master global configuration is broadcast to the multiple functional components via an interconnect as described in FIGS. 3A through 5B may be used in any apparatus, device, system, or subsystem in which multiple blocks, partitions, or components need access to a shared or common configuration space.

However, as an example application of embodiments, a video encoder is an apparatus in which digital video input is encoded or converted into another format, for example a compressed video format such as H.264/Advanced Video Coding (AVC) format (also referred to as MPEG 4 Part 10), according to a video encoding method. FIG. 7 shows an example video encoder apparatus that may implement embodiments of the methods and apparatus as illustrated in FIGS. 3A through 6B. A video encoder may include multiple functional components or units, as well as external interfaces to, for example, video input sources and external memory. In some video processing methods, to process a video sequence, each input video frame is divided into rows and columns of blocks of pixels (e.g., 16×16 pixel blocks). Each block of an input video frame is processed separately, and when done the processed blocks are combined to form an output video frame. This may be referred to as a block processing method. A block processing method may include multiple processing steps or operations that are applied sequentially to each block in a video frame.

Figure 6A:
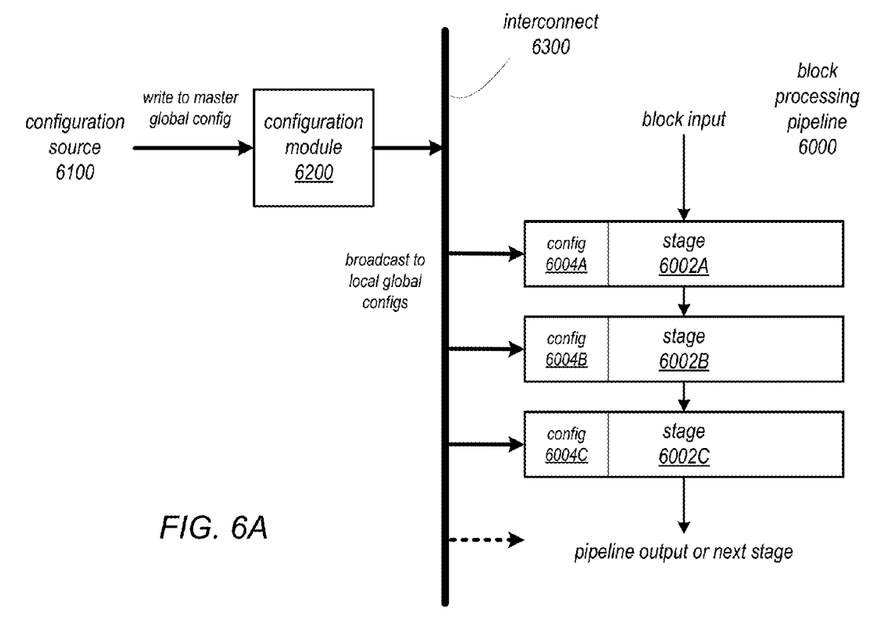
FIG. 6A illustrates applying embodiments of the methods and apparatus for configuring multiple functional components to an example block processing pipeline.
Figure 7:
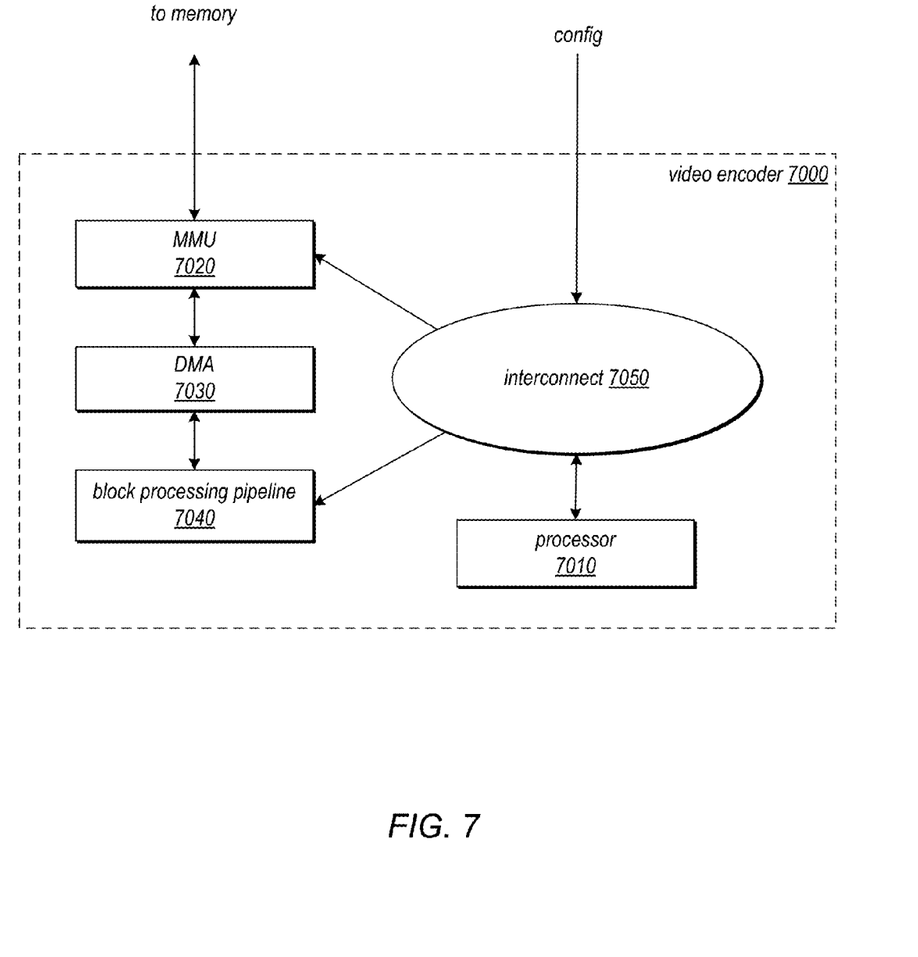
FIG. 7 is a block diagram of an example video encoder apparatus, according to at least some embodiments.

Referring to FIG. 6A, to implement a block processing method, a video encoder apparatus may include a block processing pipeline 6000. The block processing pipeline 6000 may include two or more stages 6002, with each stage implementing one or more of the steps or operations of the block processing method. A block is input to a stage 6002 of the pipeline 6000, processed according to the operation(s) implemented by the stage 6002, and results are output to the next stage 6002 or as final output by a last stage 6002. Blocks move down the pipeline 6000 from stage to stage, with each stage 6002 processing one block at a time and multiple stages concurrently processing different blocks.

Each stage 6002 of the pipeline 6000 may be implemented by one or more functional units or components. Each of the functional components may include a configuration memory 6004, for example a set of registers. The functional components may be coupled to an interconnect 6300 such as a bus subsystem. An address space of the interconnect 6300 may be allocated among the configuration memories 6004 of the functional components, with each configuration memory 6004 assigned a portion of the address space. The functional components of the block processing pipeline 6000 may share one or more common or global configuration parameters. Thus, a portion of each configuration memory 6004 may be allocated to the global configuration parameters for the pipeline 6000.

The configuration memory 6004 of one of the functional components may be designated as a master global configuration for the functional components of the pipeline 6000. For example, in FIG. 6A, configuration 6004A at stage 6002A may be designated as the master global configuration for the pipeline 6000. The apparatus may include a configuration module 6200 coupled to the interconnect 6300. A configuration source 6100 (e.g., a processor or processors of the video encoder apparatus or a processor external to the video encoder apparatus) may periodically or aperiodically configure the block processing pipeline 6000. For example, the video encoder apparatus may reconfigure the block processing pipeline 6000 at video frame boundaries. In other words, one or more global configuration parameters of the pipeline 6000 may be changed to process each different frame of a video sequence. To set one or more global configuration parameters for all of the pipeline components at stages 6002, a single write may be issued to the master global configuration, in this example to configuration 6004A at stage 6002A. Configuration module 6200 receives the write, determines that the write is addressed to the master global configuration 6004A, translates the address to all of the global portions of the configurations 6004 for all of the functional components at the stages 6002 of the pipeline 6000, and broadcasts the write to the global portions of the configurations 6004 of all of the components of the pipeline 6000 via the interconnect 6300.

Figure 6B:
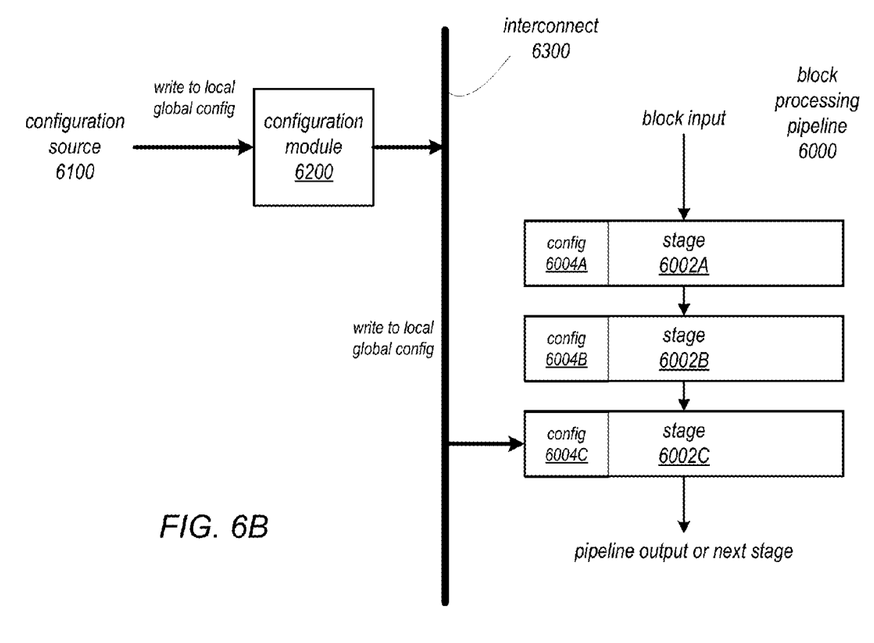
FIG. 6B illustrates overwriting a global configuration parameter or parameters for a functional component of the pipeline of FIG. 6A, according to at least some embodiments.

FIG. 6B illustrates overwriting a global configuration parameter or parameters for a functional component of the pipeline of FIG. 6A, according to at least some embodiments. In some implementations, it may be the case that one or more global configuration parameters of one or more components of a block processing pipeline need to be changed. As illustrated in FIG. 6B, in at least some embodiments, after setting the global configuration for the components at the stages 6002 of a pipeline 6000 using a write to a master global configuration 6004A that is broadcast to the global configuration 6004 of all of the components as illustrated in FIG. 6A, one or more writes may be issued to one or more specific ones of the components of the pipeline 6000 to change the settings of one or more global configuration parameters in the configurations 6004 of the target component(s).

Example Video Encoder Apparatus

FIG. 7 is a block diagram of an example video encoder apparatus 7000 that may implement embodiments of the methods and apparatus as illustrated in FIGS. 3A through 6B, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a block processing pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including global configuration and/or configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 7, or fewer functional components than those shown in FIG. 7. An example a system-on-a-chip (SOC) that may include at least one video encoder apparatus 7000 is illustrated in FIG. 8.

Video encoder 7000 may, for example, be an H.264 video encoder apparatus that may be configured to convert input video frames from an input format into H.264/Advanced Video Coding (AVC) format as described in the H.264/AVC standard. H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". The H.264/AVC document may also be referred to as the H.264 Recommendation.

Example System on a Chip (SOC)

Figure 8:
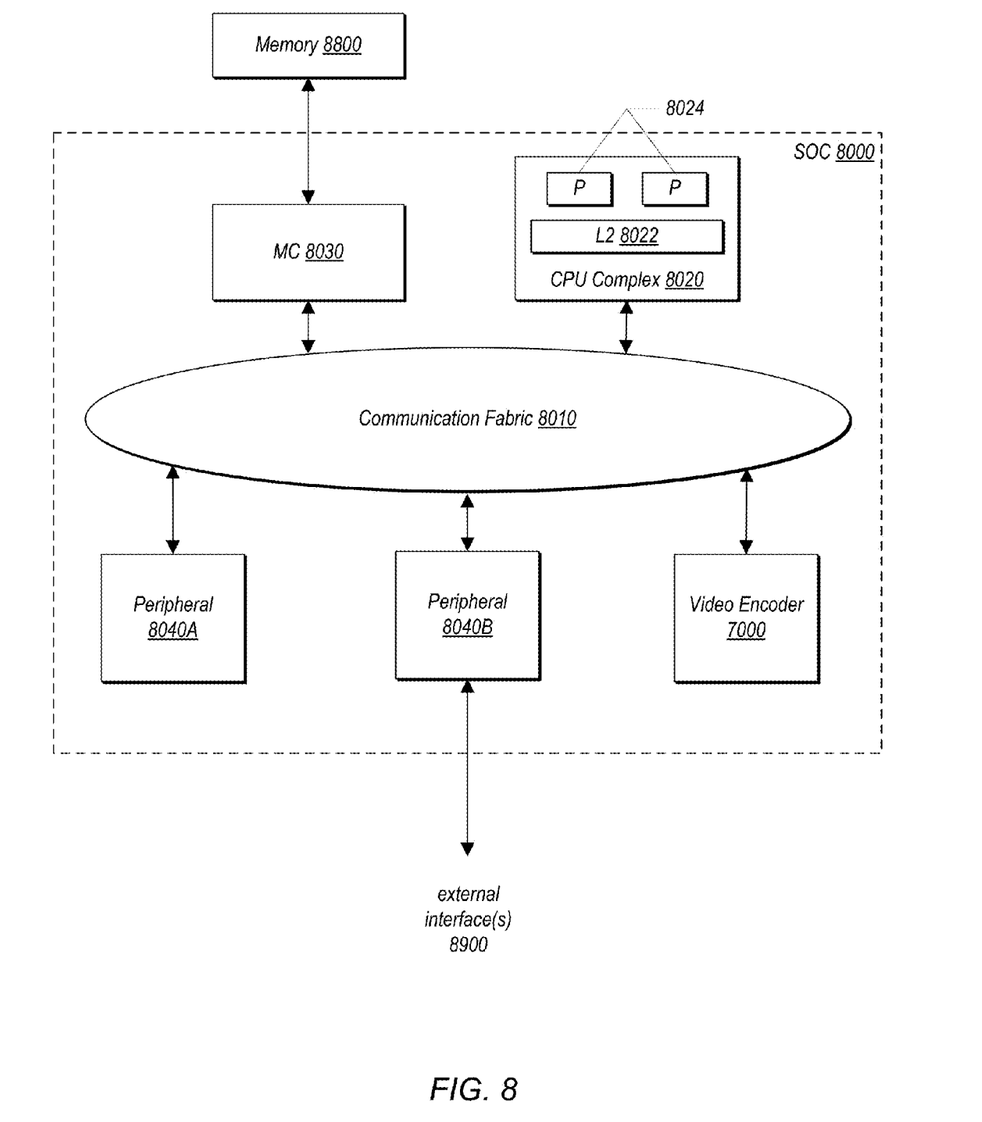
FIG. 8 is a block diagram of one embodiment of a system on a chip (SOC).

Turning now to FIG. 8, a block diagram of one embodiment of a system-on-a-chip (SOC) 8000 that may include at least one instance of a video encoder apparatus including a block processing pipeline that may implement the methods and apparatus as illustrated in FIGS. 3A through 6B. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 8, SOC 8000 may include at least one instance of a video encoder 7000 component, for example a video encoder 7000 as illustrated in FIG. 7 that includes a block processing pipeline 7040 component that implements a block processing pipeline 6000 method as illustrated in FIGS. 6A and 6B. Video encoder 7000 may, for example, be an H.264 video encoder apparatus that may be configured to convert input video frames from an input format into H.264/Advanced Video Coding (AVC) format as described in the H.264/AVC standard. In at least some embodiments, components of the block processing pipeline 7040 may be globally configured according to the methods and apparatus as described in relation to FIGS. 3A through 6B.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 8, such as within the CPU complex 8020) may vary from embodiment to embodiment. There may be more or fewer of each component/subcomponent than the number shown in FIG. 8.

Example System

Figure 9:
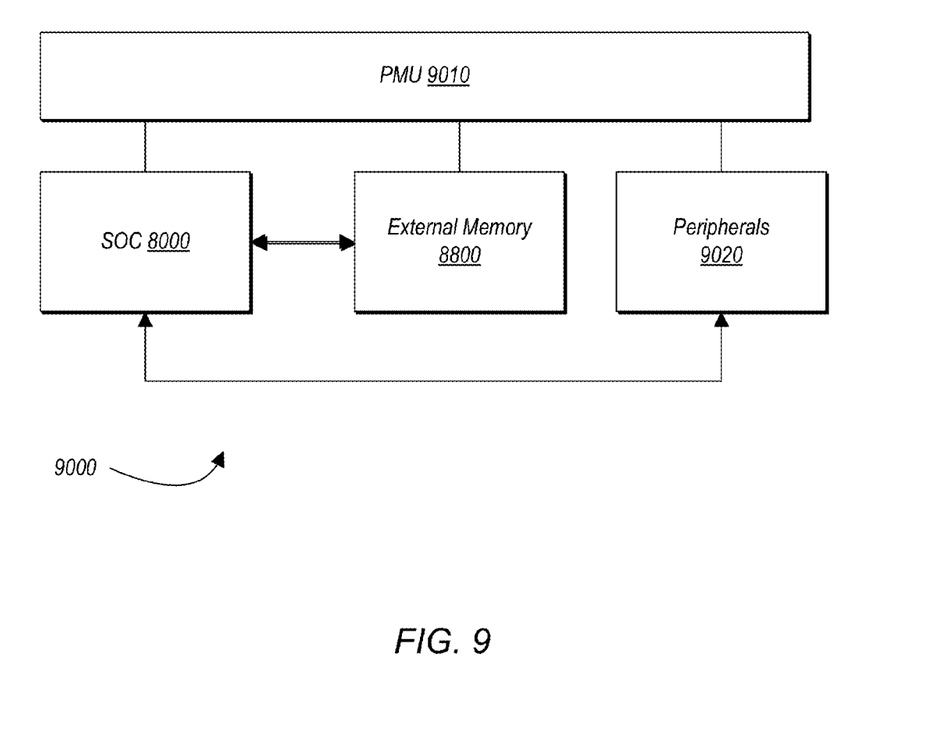
FIG. 9 is a block diagram of one embodiment of a system.

FIG. 9 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    an interconnect;
    a plurality of components each comprising a configuration memory and each coupled to the interconnect, wherein the configuration memory of each component is allocated a unique address space on the interconnect, wherein a global configuration portion of the configuration memory of each component is allocated to global configuration information common to the plurality of components, and wherein the global configuration portion of the configuration memory of one of the plurality of components is designated as a master global configuration for the plurality of components; and
    a configuration module coupled to the interconnect and configured to:
        receive a request from a configuration source;

detect that the request is a write request to the master global configuration for the plurality of components;

in response to said detecting, broadcast the write request to the global configuration portion of the configuration memory of each of the plurality of components via the interconnect;

receive another request from the configuration source; and in response to determining that the other request is a write request to the global configuration portion of the configuration memory of a particular one of the components that is not designated as the master global configuration for the plurality of components, send the write request only to the particular component via the interconnect.

2. The apparatus as recited in claim 1, wherein the broadcasted write request updates global configuration information in the global configuration portion of the configuration memory of each of the plurality of components.

3. The apparatus as recited in claim 1, wherein the configuration memory of each component comprises one or more programmable registers, and wherein the interconnect is a bus subsystem.

4. The apparatus as recited in claim 1, wherein the configuration source is a processor coupled to the configuration module and configured to control global configuration of the plurality of components.

5. The apparatus as recited in claim 1, wherein, to detect that the request is a write request to the master global configuration for the plurality of components, the configuration module is configured to decode address information for the request to determine that the request is targeted at the global configuration portion of the configuration memory of the component that is designated as the master global configuration for the plurality of components.

6. The apparatus as recited in claim 1, wherein, to broadcast the write request to the global configuration portion of the configuration memory of each of the plurality of components via the interconnect, the configuration module is configured to:

translate address information for the request to determine an interconnect address within the address space of the configuration memory of each of the plurality of components; and send the write request to each of the plurality of components via the interconnect according to the determined interconnect addresses.

7. The apparatus as recited in claim 1, wherein the component that is designated as the master global configuration for the plurality of components is a component that only serves as the master global configuration for the other components, wherein the other components are functional components that each perform an operation of the apparatus according to global configuration information in the global configuration portion of the configuration memory of the respective component.

8. A method, comprising:

designating one of a plurality of components coupled to an interconnect as a master global configuration component for all of the plurality of components;

receiving, by a module coupled to the interconnect, a write request directed to the master global configuration component;

in response to said receiving, broadcasting the write request to each of the plurality of components via the interconnect;

in response to the broadcasted write request directed to the master global configuration component, updating global configuration information in a global configuration portion of a configuration memory of each of the plurality of components;

receiving, by the module, another write request from the configuration source; and in response to determining that the other request is a write request to a particular one of the components that is not designated as the master global configuration component, sending the other write request only to the particular component via the interconnect.

9. The method as recited in claim 8, wherein each of the plurality of components comprises a configuration memory, wherein the configuration memory of each component is allocated a unique address space on the interconnect, wherein a global configuration portion of the configuration memory of each component is allocated to global configuration information common to the plurality of components.

10. The method as recited in claim 8, wherein the configuration memory of each component comprises one or more programmable registers, wherein the interconnect is a bus subsystem, and wherein the configuration source is a processor coupled to the module and configured to control global configuration of the plurality of components.

11. The method as recited in claim 8, further comprising decoding, by the module, address information for the write request to determine that the request is targeted at a global configuration portion of a configuration memory of the component that is designated as the master global configuration for the plurality of components.

12. The method as recited in claim 8, wherein said broadcasting the write request to each of the plurality of components via the interconnect comprises:

translating address information for the request to determine an interconnect address within the address space of the configuration memory of each of the plurality of components; and sending the write request to each of the plurality of components via the interconnect according to the determined interconnect addresses.

13. The method as recited in claim 8, further comprising:

receiving, by the module, another write request directed to one of the components that is not designated as the master global configuration component for the plurality of components;

in response to said receiving the other write request, broadcasting the other write request to each of the plurality of components via the interconnect; and in response to the broadcasted other write request, decoding, by each of the plurality of components, address information for the other write request to determine if the other write request is targeted at the configuration memory of the respective component, wherein the write request is accepted by the component only if targeted at the configuration memory of the component.

14. An apparatus, comprising:

an interconnect;

a block processing pipeline that includes a plurality of functional components, each functional component coupled to the interconnect and configured to perform one or more operations on a block of pixels from a frame passing through the pipeline;

wherein a configuration memory of each functional component of the pipeline is allocated a unique address space on the interconnect, wherein a global configuration portion of the configuration memory of each functional component in the pipeline is allocated to global configuration information common to the functional components of the pipeline, and wherein the global configuration portion of the configuration memory of one of the plurality of functional components in the pipeline is designated as a master global configuration for the pipeline;

a configuration module coupled to the interconnect and configured to:
receive a request from a pipeline configuration source;
determine that the request is a write request to the master global configuration for the pipeline; and
in response to said determining, broadcast the write request to the global configuration portion of the configuration memory of each of the plurality of functional components of the pipeline via the interconnect,
wherein the broadcasted write request updates global configuration information in the global configuration portion of the configuration memory of each of the plurality of functional components of the pipeline;
receive another request from the configuration source; and
in response to determining that the other request is a write request to the global configuration portion of the configuration memory of a particular one of the functional components that is not designated as the master global configuration for the pipeline, send the write request only to the particular functional component via the interconnect.

15. The apparatus as recited in claim 14, wherein the apparatus further comprises at least one processor, and wherein the configuration source is a software program executing on the at least one processor.

16. The apparatus as recited in claim 14, wherein, to determine that the request is a write request to the master global configuration for the pipeline, the configuration module decodes address information for the request to determine that the request is targeted at the global configuration portion of the configuration memory of the functional component that is designated as the master global configuration for the pipeline.

17. The apparatus as recited in claim 14, wherein, to broadcast the write request to the global configuration portion of the configuration memory of each of the plurality of functional components of the pipeline via the interconnect, the configuration module is configured to:
translate address information for the request to determine an interconnect address within the address space of the configuration memory of each of the plurality of functional components; and
send the write request to each of the plurality of functional components via the interconnect according to the determined interconnect addresses.

* * * * *